Dec. 10, 1929.                A. S. HARBOUR                1,738,532
                            ENGINE MOUNTING
                          Filed Nov. 23, 1928
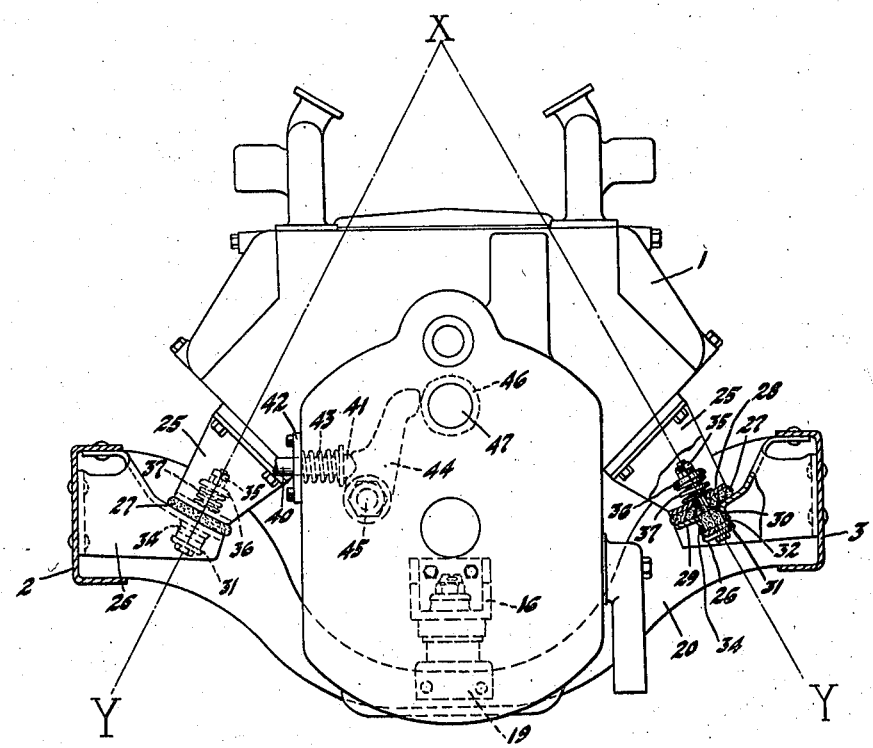
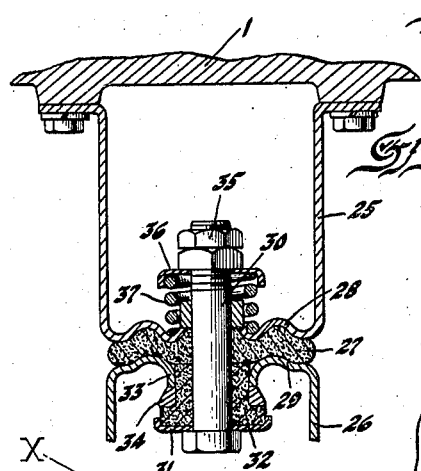
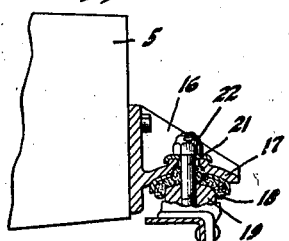
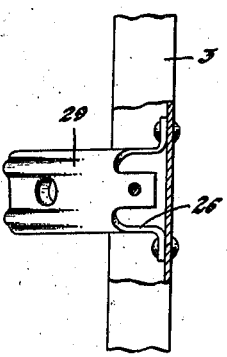
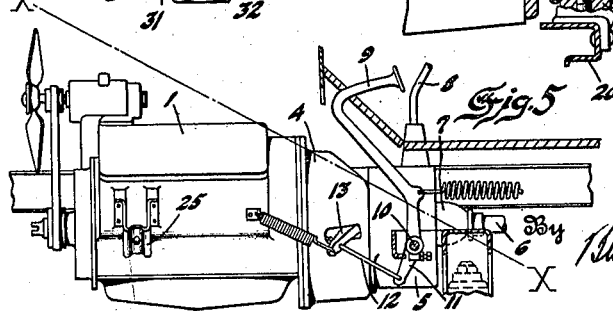
Inventor
Albert Stanley Harbour
By Blackmore, Spencer & Hiih
Attorney Patented Dec. 10, 1929

1,738,532

UNITED STATES PATENT OFFICE

ALBERT STANLEY HARBOUR, OF PONTIAC, MICHIGAN, ASSIGNOR TO GENERAL MOTORS CORPORATION, OF DETROIT, MICHIGAN, A CORPORATION OF DELAWARE

ENGINE MOUNTING

Application filed November 23, 1928. Serial No. 321,312.

This invention relates to improvements in resilient mountings, particularly intended for the purpose of supporting in a chassis frame of a motor vehicle, an internal combustion engine having inherent lateral vibration.

It is an object of the invention to provide a resilient mounting that will serve, in a sense, to insulate the engine and frame from each other in a manner that shocks and vibrations are effectively cushioned, and their transmission from one to the other prevented, whereby the incidental strains and harmful effects are eliminated and the occupants of the motor car are relieved from disagreeable sensations.

In an eight cylinder 90° V-type engine, which is one having two banks or rows of four cylinders each, arranged side by side with the axis of the cylinders positioned at right angles to each other, wherein the pistons act through the usual connecting rods on an unbalanced crank shaft having its cranks in a single plane, the unbalanced forces active during engine operation, set up a resultant lateral vibration of the engine as a whole. While such inherent vibration is of small amplitude, amounting to but a few thousands of an inch, it is of high frequency that varies in accordance with engine speed and in the event the engine and frame are rigidly connected, the constantly occuring vibratory reactions sent throughout the entire vehicle chassis, cause rattle and noise in some parts, and place damaging strains and stresses on others, and all the while are highly disagreeable to the nervous systems of the driver and his passengers. The unbalanced operating forces, torque reactions, and the like, tend to swing or oscillate this type of engine about an imaginary axis that extends longitudinally of the engine and centrally thereof, from above the front of the engine, diagonally downward toward the rear, where it intersects the axis of the crank shaft somewhere beyond the engine, near the transmission gearing or the universal joint, as these parts are arranged in a conventional manner.

It is with engines of this type that the present invention is especially concerned and to meet the conditions presented, the invention contemplates the formation of cooperating surfaces on the engine and supporting frame that lie on arcs of circles whose centers are on the axis about which the engine oscillates, and between which arcuate surfaces, there is interposed a body or pad of elastic material that is deformable to accommodate and permit relative movement of the adjacent arcuate surfaces upon vibration of the engine. To resist deformation of the elastic material and relative fore and aft movement, as might tend to occur, because of road shocks, momentum, or other extraneous forces the cooperating surfaces are preferably corrugated or undulated in a longitudinal direction, to present offset or co-acting ribs and depressions extending transversely of the vehicle or in the direction of the inherent oscillations. The engine is, therefore, cushioned against shock, and stably supported in the frame and held against movements of major proportions, while engine vibrations of small amplitude are effectually damped out and prevented from being transmitted through the chassis frame and associated parts.

The invention will be more fully understood upon reference to the accompanying drawing illustrating a preferred embodiment, and wherein Figure 1 is a front elevation, partly in section, of an engine supported in a chassis frame according to the present invention; Figure 2 is a longitudinal sectional view of one of the points of connection between the engine and frame; Figure 3 is a top plan view of a supporting bracket secured to the chassis frame; Figure 4 is a detail sectional view of the mounting for the rear of the engine, and Figure 5 is a side elevation of the engine mounted in the frame.

Referring to the drawing the engine 1 is of the eight cylinder 90° V-type and is supported on a chassis frame having a pair of longitudinally extending channel shaped side members 2 and 3. Secured to, and forming a part of the engine or power plant unit, is a suitable clutch enclosed within a housing 4, and change speed gearing or transmission mechanism encased within the housing 5, through which the rotation of the engine crankshaft is transmitted to the propeller or drive shaft 6, connected with the transmission shafting through a universal joint 7. A gear shift lever 8 extending upwardly beside the driver's seat controls the change speed mechanism and a foot operated pedal 9 controls the clutch, it being pivoted on a fixed shaft 10 at its lower end and having an arm 11 connected by a rod or link 12 with the clutch operating lever 13.

Upon the operation of an engine of this type, the reciprocation of the several pistons and the actuation of the various other moving parts, produces a lateral vibration of the engine and tends to oscillate the engine, as a whole, about an imaginary axis, illustrated roughly by the broken line X—X in Figure 5, that extends centrally and longitudinally of the engine intersecting the axis of the crank shaft at the rear of the engine adjacent the universal joint 7 and projecting diagonally upward above the top of the engine at the front end. The engine tends to swing or oscillate about this imaginary line X—X, throwing the front of the engine to and fro throughout a small amplitude or range of movement.

It is proposed to support the rear of the engine at a single central point closely adjacent the neutral axis or at a point where the vibration is practically imperceptible and not so pronounced. To this end a bracket 16 is bolted or otherwise secured to the rear of the transmission housing 5 and is provided with a concave or socketed recess on its under surface in which is positioned a partispherical cup 17 having therein a concavo-convex pad 18 of rubber or other similar elastic deformable material, that rests upon the upper convex surface of a bracket 19, secured as by rivets to the transverse frame member 20. A connecting bolt or stud 21 threaded into the bracket 19 projects thru the pad 18 and bracket 16, and has a nut 22 threaded on its upper end, to hold the parts in assembled relation. The rear support thus described affords a sort of universal joint, the relative movement being permitted by the deformation of the rubber pad which also cushions shocks and insulates the frame and engine from each other.

In addition to the single point of suspension at the rear, the engine is also supported at two points at its front end whereby there is afforded a three point suspension arrangement which is found to be highly effective in relieving the engine from the racking strains incident frame weaving, as occurs when the vehicle is negotiating rough roads.

The two front supports are located one on each side of the engine and are identical, each comprising a U-shaped bracket 25, preferably stamped from sheet metal and bolted to engine 1, and a second bracket 26 also of U-shape and stamped from sheet metal that is riveted to the chassis frame, with a pad or body 27 of rubber or the like, interposed between the adjacent surfaces of the bases or connecting portions 28 and 29 of the brackets 25 and 26 respectively. The mating surfaces of the brackets are arcuate in shape and form arcs of circles whose centers are on the axis X—X about which the engine oscillates. A fastening bolt 30 positioned on the radial line XY, extends through openings in the parts 28 and 29 and carries a retainer disc or plate 31 for a sleeve or bushing 32 of rubber, or the like, which surrounds the bolt and extends through the opening in the member 29, seating against the annular flange 33 at the opening to cushion lateral movement of the fastening bolt 30. A ring 34 is interposed between the lower edge of the flange 33 and an annular flange formed at the lower end of the elastic sleeve. At its upper end the fastening bolt 30 carries a pair of lock nuts 35 holding in place a retaining cup 36 for the coil spring 37, interposed between the cup 36 and base 38 of the bracket 35. The spring is preferably placed under slight compression and its tension yieldingly holds the parts in assembled relation.

The mating faces of the brackets 25 and 26 being formed on arcs about the center of oscillation greatly facilitate the deformation of the rubber in permitting and cushioning the inherent lateral vibration of the engine. To restrict relative longitudinal movement, the mating faces are preferably corrugated longitudinally or formed with co-acting transverse ribs and depressions, which offer resistance to the deformation of the elastic pad 27 in directions other than direction of the movement caused by inherent engine vibrations. The engine is stably supported in the frame while the high frequency vibrations of small amplitude are damped out.

In some instances, it may be found desirable, for the purpose of further stabilization of the engine in the frame, to employ a bracing element which automatically varies in length in synchronism with vibratory movements. This bracing element may consist of a rod 40, rigidly connected with the chassis frame and having an enlarged head 41 at one end located within a chambered part of the engine block and between which head and a cover plate 42 at the side of the chamber, is interposed a coil spring 43. The head 41 bears against a lever or cam follower 44 pivoted at 45, and whose nose bears against a four-lobed cam 46 on the cam shaft 47. Rotation of the cam 46 rocks the follower lever 44 to vary the effective length of the brace, dependent upon the vibratory reactions of the engine. Since the vibrations occur twice for each rotation of the crank shaft, and the crank shaft rotates twice for each rotation of the cam shaft, the four-lobes on the cam vary the length of the brace in direct relation with engine vibration. This synchronized bracing arrangement is fully described and claimed in the pending application S. N. 314,203, filed by Caleb E. Summers.

I claim:

1. Means for resiliently mounting an engine, or the like, that has an inherent lateral vibration set up by the unbalance of its moving parts and oscillating about a neutral axis extending longitudinally of the engine, including in combination with such an engine, of a support on which the engine rests, and a pad of cushioning material interposed between adjacent faces of the engine and support, such adjacent faces being arcuate in shape, and the center of the arcs being substantially on said neutral axis of oscillation.

2. Means for resiliently mounting an engine, or the like, that has an inherent lateral vibration set up by the unbalance of its moving parts and oscillating about a neutral axis extending longitudinally of the engine, including in combination with such an engine, of a support on which the engine rests, and elastic deformable material interposed between adjacent arcuate faces on the engine and support and permitting relative movement between the engine and support, the arcs of said faces having their centers substantially on said axis of oscillation.

3. Means for resiliently mounting an engine, or the like, that has an inherent lateral vibration set up by the unbalance of its moving parts and oscillating about a neutral axis extending longitudinally of the engine, including in combination with such an engine, of a support on which the engine rests, the adjacent surfaces of the engine and support mating with each other and extending along an arc of a circle whose center is on the axis of oscillation, and elastic deformable material interposed between said surfaces, and being deformable to accommodate the inherent engine vibration.

4. In combination with a support and a body to be supported having inherent lateral vibration and oscillating about a longitudinally extending axis, of a connection between the support and body including mating surfaces shaped to form arcs of circles whose centers are located substantially on the axis of oscillation.

5. The structure of claim 4 wherein the arcuate surfaces are undulated in a direction extending transversely of the arcs.

6. In combination with a support and a body to be supported having inherent lateral vibration and oscillating about a longitudinally extending axis, of a connection between the support and body including mating surfaces shaped to form arcs of circles whose centers are located substantially on the axis of oscillation, and elastic deformable material interposed between said arcuate surfaces and deformable to permit relative movement of said surfaces resulting from inherent vibrations of the body.

7. In combination with a support and a body to be supported having inherent lateral vibration and oscillating about a longitudinally extending axis, of a connnection between the support and body including mating surfaces shaped to form arcs of circles whose centers are located substantially on the axis of oscillation and having cooperating offset portions extending in the direction of the arcs, and elastic deformable material between said surfaces, deformable to accommodate relative movements of the surfaces, but which deformation is resisted in a direction transversely of the arcs by said cooperating offset portions.

8. In combination with a support and a body to be supported having inherent lateral vibration and oscillating about a longitudinally extending axis, of a connection between the support and body including mating surfaces shaped to form arcs of circles whose centers are located substantially on the axis of oscillation and having depressions extending in the direction of the arcs, and elastic deformable material interposed between said surfaces and projecting into said depressions, whereby its deformation is unrestrained to accommodate relative movements of said surfaces upon vibrations inherent in the body but is resisted upon movements in other directions.

9. A three point suspension for V-type engines having inherent lateral vibrations oscillating about an axis extending longitudinally at the center of the engine downwardly from above the front of the engine and intersecting the axis of the engine crankshaft adjacent the rear of the engine, including in combination with a supporting frame, means to yieldingly mount at a single point on the frame the rear of the engine adjacent its axis of oscillation, and a connection between each side of the engine at the front thereof and the frame, including deformable material interposed between mating surfaces of the engine and frame, that extend substantially at right angles to the axis of oscillation to permit relative lateral movement of the parts connected, whereby the inherent engine vibrations may occur without being transmitted to the frame.

10. A three point suspension for engines having inherent lateral vibrations oscillating about an axis extending longitudinally at the center of the engine downwardly from above the front of the engine and intersecting the axis of the engine crankshaft adjacent the rear of the engine, including in combination with a supporting frame, means to yieldingly mount on the frame the rear of the engine adjacent its axis of oscillation, and a connection between each side of the engine at the front thereof and the frame, including cooperating surfaces of arcuate shape associated with the engine and frame respectively, and forming an arc of a circle whose center is on the axis of oscillation, and elastic deformable material interposed between the cooperating arcuate surfaces and adapted for deformation to accommodate relative movement of the parts due to the inherent engine vibrations.

11. In a motor vehicle, the combination with an engine having inherent lateral vibration oscillating about a longitudinal axis, of means to support the engine at opposite side thereof including a frame having arcuate supporting surfaces that form arcs of a common circle, whose center is on the axis of oscillation, parts associated with the engine that are to be connected with said frame and having arcuate surfaces thru which the engine is supported and which are similar to and cooperate with said arcuate supporting surfaces, and elastic deformable material interposed between the cooperating arcuate surfaces of the engine and frame, and which is deformable between said surfaces to accommodate the inherent engine vibrations.

12. Means for resiliently mounting in a frame an engine having inherent lateral vibrations that oscillate the engine about a longitudinal axis, including cooperating frame and engine brackets adapted to be secured one to the other and having their adjacent surfaces of arcuate shape, forming arcs of circles whose centers are on the axis of oscillation of the engine, elastic deformable material interposed between said arcuate surfaces, adapted for deformation to permit relative movement of the surfaces upon lateral vibration of the engine about the axis of oscillation.

13. Means for resiliently mounting in a frame an engine having inherent lateral vibrations that oscillate the engine about a longitudinal axis, including cooperating frame and engine brackets adapted to be secured one to the other and having their adjacent surfaces of arcuate shape, forming arcs of circles whose centers are on the axis of oscillation of the engine, elastic deformable material interposed between said arcuate surfaces, adapted for deformation to permit relative movement of the surfaces upon lateral vibration of the engine about the axis of oscillation, a fastening element extending thru the brackets and the intermediate elastic deformable material, a sleeve of elastic material surrounding said element and extending thru the opening in one of the brackets and bearing against underside of the bracket, and an elastic member carried under tension by the fastening element and bearing on the other bracket to yieldingly hold the parts together.

14. Means for resiliently mounting in a frame, an engine having inherent lateral vibration that tends to swing the engine about an axis extending longitudinally of the engine, including cooperating frame and engine brackets that are secured one to the other and have their adjacent surfaces corrugated in a longitudinal direction and arcuate in a transverse direction, the respective arcs being parts of circles whose centers are on the axis of vibratory swinging movement of the engine, and elastic deformable material interposed between said surfaces to cushion relative movement by its deformation and which is readily deformable in a transverse direction under influence of engine vibration, but whose deformation in a longitudinal direction is resisted by the corrugations in the surfaces of the brackets.

15. A suspension for engines having inherent lateral vibrations oscillating about an axis extending longitudinally at the center of the engine downwardly from above the front of the engine and intersecting the axis of the engine crankshaft adjacent the rear of the engine, including in combination with a supporting frame, means to yieldingly mount on the frame, the rear of the engine adjacent the point of intersection of the axis of oscillation and the axis of the crankshaft, and a connection between each side of the engine adjacent the front thereof and the frame, including seats on the engine and frame that extend substantially in the direction of oscillatory movement of the engine about the said axis, and deformable material interposed between the seats to cushion inherent lateral vibrations of the engine.

In testimony whereof I affix my signature.

ALBERT STANLEY HARBOUR.